(12) United States Patent
Zhong et al.

(10) Patent No.: US 12,367,541 B2
(45) Date of Patent: Jul. 22, 2025

(54) METHOD AND DEVICE FOR IMPROVING GRAPHICS PERFORMANCE

(71) Applicant: MediaTek Singapore Pte. Ltd., Singapore (SG)

(72) Inventors: Wenxiang Zhong, Chengdu (CN); Peng Li, Chengdu (CN); Chuanghua Zhao, Chengdu (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 176 days.

(21) Appl. No.: 18/057,300

(22) Filed: Nov. 21, 2022

(65) Prior Publication Data
US 2024/0144415 A1 May 2, 2024

(30) Foreign Application Priority Data
Nov. 1, 2022 (CN) .......................... 202211357576.4

(51) Int. Cl.
*G06T 1/60* (2006.01)
*G06T 1/20* (2006.01)

(52) U.S. Cl.
CPC . *G06T 1/60* (2013.01); *G06T 1/20* (2013.01)

(58) Field of Classification Search
CPC ........... G06T 1/60; G06T 1/20; G09G 3/2022; G09G 5/363; G09G 5/37; G09G 2310/0286
See application file for complete search history.

(56) References Cited

U.S. PATENT DOCUMENTS

| 10,388,255 | B2* | 8/2019 | Thakur ................... G09G 5/12 |
| 10,445,043 | B2 | 10/2019 | Begeman et al. |
| 11,200,636 | B2 | 12/2021 | Chen et al. |
| 11,373,268 | B2 | 6/2022 | Alla et al. |
| 11,657,781 | B2* | 5/2023 | Thakur ................ G02B 27/017 345/522 |
| 11,998,840 | B2* | 6/2024 | Colenbrander .... H04N 21/2343 |
| 12,131,694 | B2* | 10/2024 | Wang ................... G09G 3/3225 |
| 2003/0179221 | A1* | 9/2003 | Nitta ..................... G09G 3/3648 345/690 |
| 2019/0043448 | A1* | 2/2019 | Thakur ................... G09G 5/003 |
| 2020/0104973 | A1* | 4/2020 | Zhang ..................... G09G 5/12 |

(Continued)

FOREIGN PATENT DOCUMENTS

| CN | 107743636 A | 2/2018 |
| TW | 202121220 A | 6/2021 |

(Continued)

OTHER PUBLICATIONS

Chinese language office action dated Jul. 25, 2023, issued in application No. TW 111144361.

*Primary Examiner* — Motilewa Good-Johnson
(74) *Attorney, Agent, or Firm* — McClure, Qualey & Rodack, LLP

(57) ABSTRACT

A method for improving graphics performance is provided. The method includes: determining whether a current frame rendered into a frame buffer is a first frame in a first vertical synchronization (VSYNC) period defined by a first VSYNC signal; and pre-rendering a first next frame into the frame buffer in the first VSYNC period when the current frame is the first frame, wherein the first next frame is a frame that is next to the first frame.

10 Claims, 10 Drawing Sheets

(56) References Cited

U.S. PATENT DOCUMENTS

| | | | |
|---|---|---|---|
| 2020/0105227 A1* | 4/2020 | Zhang | G06T 1/20 |
| 2020/0278758 A1* | 9/2020 | McAllen | A63F 13/23 |
| 2022/0013087 A1* | 1/2022 | Marchya | G09G 5/363 |
| 2022/0116678 A1* | 4/2022 | Tyamgondlu | H03L 7/08 |
| 2023/0116975 A1* | 4/2023 | Chen | G06T 11/40 |
| | | | 345/629 |
| 2023/0186872 A1 | 6/2023 | Li et al. | |
| 2023/0267578 A1* | 8/2023 | Fan | G02B 27/017 |
| | | | 345/647 |
| 2023/0410732 A1* | 12/2023 | Chou | G06F 3/14 |
| 2024/0007612 A1* | 1/2024 | Fan | G09G 5/36 |

FOREIGN PATENT DOCUMENTS

| | | |
|---|---|---|
| TW | 202203003 A | 1/2022 |
| TW | 202215376 A | 4/2022 |
| WO | WO-2021232328 A1 * | 11/2021 |

* cited by examiner

METHOD AND DEVICE FOR IMPROVING GRAPHICS PERFORMANCE

CROSS REFERENCE TO RELATED APPLICATIONS

This application claims priority from China Patent Application No. 202211357576.4, filed on Nov. 1, 2022, the disclosure of which is incorporated herein in its entirety by reference.

BACKGROUND OF THE APPLICATION

Field of the Application

The present disclosure generally relates to image processing. More specifically, aspects of the present disclosure relate to a method and device for improving graphics performance.

Description of the Related Art

Devices often utilize a graphics processing unit (GPU) to accelerate the rendering of graphical data for display. User experience is in part determined by how smoothly the user interface (UI) animation runs on the device for any particular application. For example, the ANDROID operating system often stutters due to skipped or dropped frames.

FIG. 1 is a schematic diagram of a normal rendering process in the prior art.

This timing diagram shows active periods for a system and a display, wherein the system may comprise a central processing unit (CPU), display hardware (or GPU), and a composition engine (composition hardware/software module).

The system is responsible for rendering frames, wherein each frame is represented by a box and numbered with numbers, such as F0, F1, F2, F3 and so on. A VSYNC signal (which can also be a VSync signal or VSYNC pulse) periodically triggers the rendering of the UI. First, the system renders the frame F0 after the first VSYNC signal arrives. Then, the system renders the frame F1 and the display displays the frame F0 after the second VSYNC signal arrives, and so forth. Each frame is rendered between two VSYNC signals.

However, the system may not be able to complete complex rendering operations in the allotted time between two VSYNC signals. There are factors that may be responsible for this, such as slow loading of the network, one or more bugs within applications, complex scene design, and the capabilities supported by the system are insufficient. This will cause dropped frames.

FIG. 2 is a schematic diagram of a rendering process in which a dropped frame occurs in the prior art. For some reason, the CPU resources are occupied performing other computationally intensive tasks, or the GPU renders animation frames that are too complex, and so the system cannot complete the rendering of the frame F3 in time before the fifth VSYNC signal arrives. That is, the rendering time of the system may exceed the period between two VSYNC signals. Since the rendering of the frame F3 has not been completed, the display cannot display the frame F3 when the fifth VSYNC signal arrives. The result is dropped frames that can cause a visual stuttering effect or choppiness instead of smooth, responsive movement, e.g., when a user scrolls the resulting display.

Therefore, a novel method is required for solving the above-mentioned problems and giving the user a better viewing experience.

SUMMARY

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

Therefore, the main purpose of the present disclosure is to provide a method and device for improving graphics performance to solve the above-mentioned problems.

In an exemplary embodiment, a method for improving graphics performance is provided. The method comprises the following steps: determining whether a current frame rendered into a frame buffer is a first frame in a first vertical synchronization (VSYNC) period defined by a first VSYNC signal; and pre-rendering a first next frame into the frame buffer in the first VSYNC period when the current frame is the first frame, wherein the first next frame is a frame that is next to the first frame.

In some embodiments, the method further comprises the following steps: determining whether a frequency of a second VSYNC signal is different from a frequency of the first VSYNC signal in the first VSYNC period, wherein the second VSYNC signal is a VSYNC signal that is next to the first VSYNC signal; and pre-rendering a second next frame in a second VSYNC period defined by the second VSYNC signal when the frequency of the second VSYNC signal is different from the frequency of the first VSYNC signal, wherein the second next frame is a frame next to a frame scheduled to be rendered in the second VSYNC period.

In some embodiments, the method further comprises waiting for a third VSYNC signal when the frequency of the second VSYNC signal is not different from the frequency of the first VSYNC signal, wherein the third VSYNC signal is a VSYNC signal that is next to the second VSYNC signal.

In an exemplary embodiment, a method for improving graphics performance is provided. The method comprises the following steps: determining whether a current frame rendered into a frame buffer has been dropped in a first vertical synchronization (VSYNC) period defined by a first VSYNC signal; and pre-rendering a first next frame into the frame buffer in the first VSYNC period or pre-rendering a second next frame into the frame buffer in a second VSYNC period defined by a second VSYNC signal when determining that the current frame has been dropped, wherein the second VSYNC signal is a VSYNC signal that is next to the first VSYNC signal, the first next frame is a frame that is next to the current frame and the second next frame is a frame that is next to a frame scheduled to be rendered in the second VSYNC period.

In some embodiments, the method further comprises determining whether a frequency of the second VSYNC signal is different from a frequency of the first VSYNC signal in the first VSYNC period. The method further comprises determining whether the second next frame has been pre-rendered into the frame buffer in the second VSYNC period when the frequency of the second VSYNC signal is different from the frequency of the first VSYNC signal. The method further comprises pre-rendering the second next frame in the second VSYNC period when the second next frame has not been pre-rendered into the frame buffer in the second VSYNC period.

In some embodiments, the method further comprises waiting for a third VSYNC signal when the second next frame has been pre-rendered into the frame buffer in the second VSYNC period, wherein the third VSYNC signal is a VSYNC signal that is next to the second VSYNC signal.

In some embodiments, the method further comprises waiting for a third VSYNC signal when the frequency of the second VSYNC signal is not different from the frequency of the first VSYNC signal, wherein the third VSYNC signal is a VSYNC signal that is next to the second VSYNC signal.

In an exemplary embodiment, a device for improving graphics performance is provided. The device comprises at least one processor, and a computer-readable storage medium configured to store instructions, that when executed by the processor, cause the device to perform functions. The functions comprise determining whether a current frame rendered into a frame buffer is a first frame in a first vertical synchronization (VSYNC) period defined by a first VSYNC signal; and pre-rendering a first next frame into the frame buffer in the first VSYNC period when the current frame is the first frame, wherein the first next frame is a frame that is next to the first frame.

In an exemplary embodiment, a device for improving graphics performance is provided. The device comprises at least one processor, and a computer-readable storage medium configured to store instructions, that when executed by the processor, cause the device to perform functions. The functions comprise determining whether a current frame rendered into a frame buffer has been dropped in a first vertical synchronization (VSYNC) period defined by a first VSYNC signal; and pre-rendering a first next frame into the frame buffer in the first VSYNC period or pre-rendering a second next frame into the frame buffer in a second VSYNC period defined by a second VSYNC signal when determining that the current frame has been dropped, wherein the second VSYNC signal is a VSYNC signal that is next to the first VSYNC signal, the first next frame is a frame that is next to the current frame and the second next frame is a frame that is next to a frame scheduled to be rendered in the second VSYNC period.

BRIEF DESCRIPTION OF DRAWINGS

The accompanying drawings are included to provide a further understanding of the present disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to their size in actual implementation in order to clearly illustrate the concept of the present disclosure.

DETAILED DESCRIPTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using number of the aspects set forth herein. In addition, the scope of the disclosure is intended to cover such an apparatus or method which is practiced using another structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

For the purposes of this disclosure "VSYNC" is a signal or a pulse within a computing system that synchronizes certain events to the refresh cycle of the display. Applications start drawing on a VSYNC boundary, and composition hardware or software (e.g., SurfaceFlinger module as used by the ANDROID Operating system) can start compositing on VSYNC boundaries. This allows for smooth application rendering (time based animation) synchronized by the periodicity of the VSYNC signal.

Figure 1:
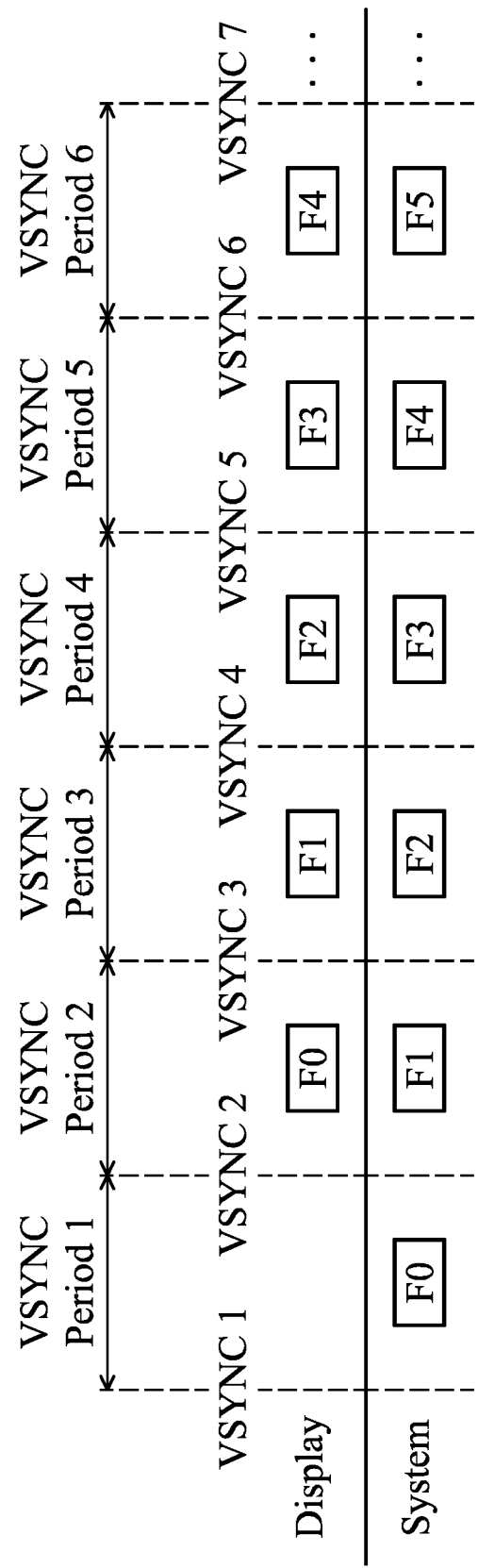
FIG. 1 is a schematic diagram of a normal rendering process in the prior art.
Figure 2:
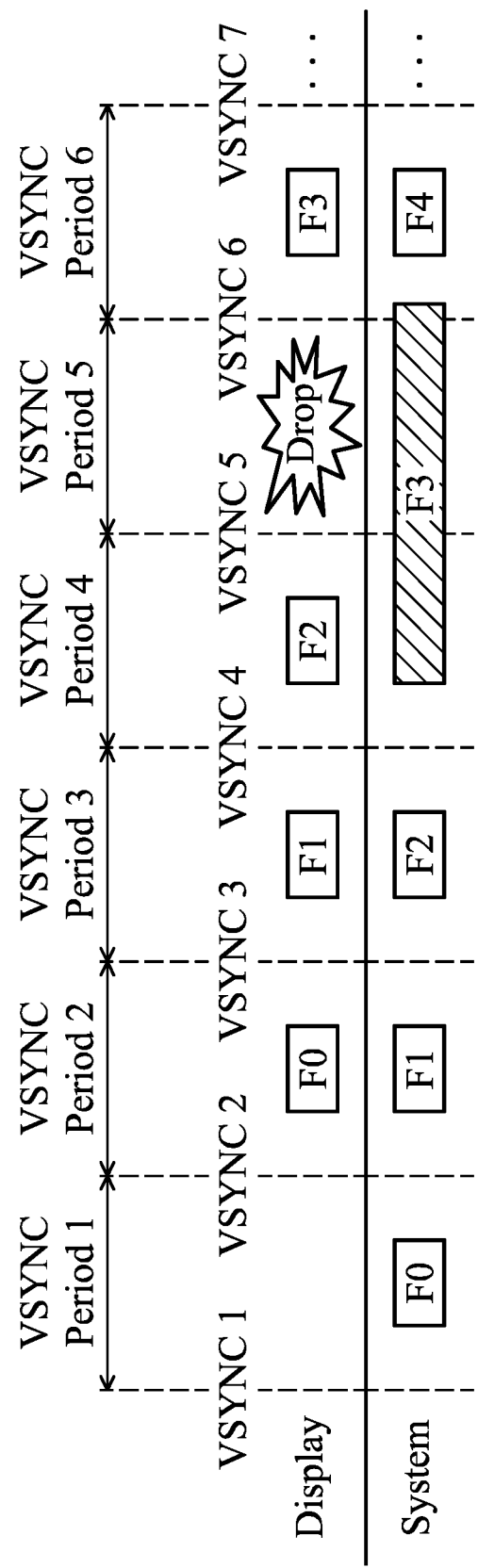
FIG. 2 is a schematic diagram of a rendering process in which a dropped frame occurs in the prior art.
Figure 3:
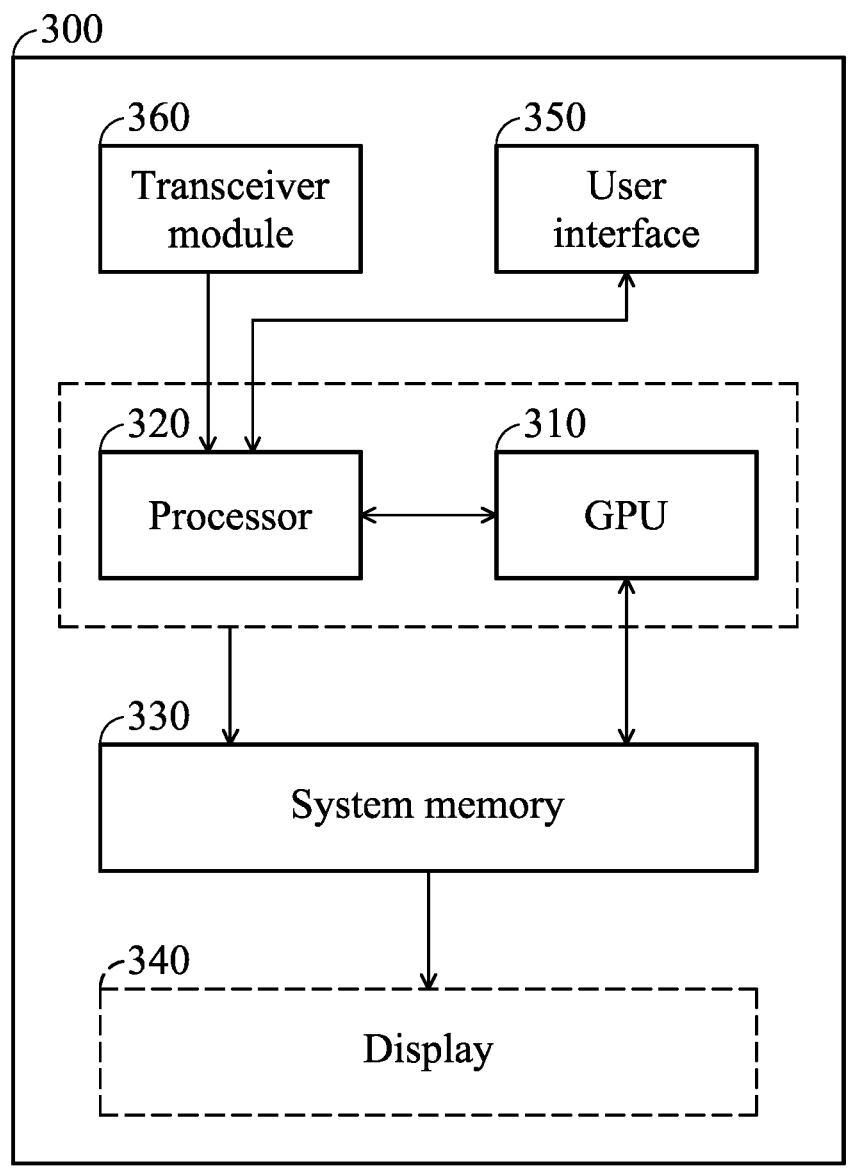
FIG. 3 is a block diagram illustrating an example device that may implement the techniques of this disclosure for improving graphics performance.

FIG. 3 is a block diagram illustrating an example device that may implement the techniques of this disclosure for improving graphics performance. FIG. 3 illustrates the device 300 that includes a GPU 310, a system memory 330, and a processor 320, which may be a central processing unit (CPU). Examples of the device 300 include, but are not limited to, video devices such as media players, set-top boxes, wireless handsets such as mobile telephones, personal digital assistants (PDAs), desktop computers, laptop computers, gaming consoles, video conferencing units, tablet computing devices, and other such devices. The device 300 may include components in addition to those illustrated in FIG. 3.

The system memory 330 may be considered as the memory for the device 300. The system memory 330 may comprise one or more computer-readable storage media. Examples of the system memory 330 include, but are not limited to, a random access memory (RAM), an electrically erasable programmable read-only memory (EEPROM), flash memory, or any other medium that can be used to carry or store desired program code in the form of instructions and/or data structures and that can be accessed by a computer or a processor.

In some aspects, the system memory 330 may include instructions that cause the processor 320 and/or the GPU 310 to perform the functions ascribed to the processor 320 and the GPU 310 in this disclosure. Accordingly, the system memory 330 may be a computer-readable storage medium having instructions stored thereon that, when executed, cause one or more processors (e.g., the processor 320 and the GPU 310) to perform various functions.

The system memory 330 may, in some examples, be considered as a non-transitory storage medium. The term "non-transitory" may indicate that the storage medium is not embodied in a carrier wave or a propagated signal. However, the term "non-transitory" should not be interpreted to mean that the system memory 330 is non-movable or that its contents are static. As one example, the system memory 330 may be removed from the device 300, and moved to another device. As another example, memory, substantially similar to the system memory 330, may be inserted into the device 300. In certain examples, a non-transitory storage medium may store data that can, over time, change (e.g., in RAM).

In some examples, such as examples where the device 300 is a wireless handset communication device, the processor 320 and the GPU 310 may be formed in an integrated circuit (IC). For example, the IC may be considered as a processing chip within a chip package, or it may be considered to be a system on a chip or portion thereof. In some examples, the processor 320 and the GPU 310 may be housed in different integrated circuits (i.e., different chip packages), such as when the device 300 is a desktop or laptop computer. However, in examples where the device 300 is a wireless handset communication device, it may be possible that the processor 320 and the GPU 310 are housed in different integrated circuits.

Examples of the processor 320 and the GPU 310 include, but are not limited to, a digital signal processor (DSP), general purpose microprocessor, application specific integrated circuit (ASIC), field programmable logic array (FPGA), or other equivalent integrated or discrete logic circuitry. In some examples, the GPU 310 may be specialized hardware that includes integrated and/or discrete logic circuitry that provides the GPU 310 with massive parallel processing capabilities suitable for graphics processing. In some instances, the GPU 310 may also include general purpose processing capabilities, and may be referred to as a general purpose GPU (GPGPU) when implementing general purpose processing tasks (i.e., non-graphics related tasks).

The processor 320 may execute various types of applications. Examples of the applications include web browsers, e-mail applications, spreadsheets, video games, or other applications that generate viewable objects for display. Instructions for execution of the one or more applications may be stored within the system memory 330. The processor 320 may transmit graphics data of the viewable objects to the GPU 310 for further processing.

For instance, the processor 320 may offload processing tasks to the GPU 310, such as tasks that require massive parallel operations. As one example, graphics processing requires massive parallel operations, and the processor 320 may offload such graphics processing tasks to the GPU 310. The processor 320 may communicate with the GPU 310 in accordance with a particular application processing interface (API). Examples of such APIs include the DirectX® API by Microsoft®, the OpenGL® API by the Khronos group, and the OpenCL™ API; however, aspects of this disclosure are not limited to the DirectX, the OpenGL, or the OpenCL APIs, and may be extended to other types of APIs. Moreover, the techniques described in this disclosure are not required to function in accordance with an API, and the processor 320 and the GPU 310 may utilize any technique for communication.

To perform graphics operations, the GPU 310 may implement a graphics processing pipeline. The graphics processing pipeline includes performing functions as defined by software or firmware executing on the GPU 310 and performing functions by fixed-function units that are hardwired to perform very specific functions. The software or firmware executing on the GPU 310 may be referred to as shader programs (or simply shaders), and the shader programs may execute on one or more shader cores of the GPU 310. Shader programs provide users with functional flexibility because a user can design the shader program to perform desired tasks in any conceivable manner. The fixed-function units, however, are hardwired for the manner in which the fixed-function units perform tasks. Accordingly, the fixed-function units may not provide much functional flexibility.

For example, the processor 320 may execute an application, such as a video game, and the processor 320 may generate graphics data as part of the execution. The processor 320 may output the graphics data for processing by the GPU 310. The GPU 310 may then process the graphics data in the graphics pipeline. In some examples, to process the graphic data, the GPU 310 may need to execute one or more shader programs. For example, the application executing on the processor 320 may cause the processor 320 to instruct the GPU 310 to retrieve a shader program from the system memory 130 and instruct the GPU 310 to execute the shader program.

The GPU 310 may also be configured to execute commands that are issued to the GPU 310 by the processor 320. The commands executed by the GPU 310 may include general-purpose computing commands, task execution commands (e.g., kernel execution commands), memory transfer commands, etc. The GPU 310 may be configured to perform general-purpose computing for applications executing on the processor 320. For example, when a host program, which is executing on the processor 320, decides to off-load a computational task to the GPU 310, the processor 320 may provide general-purpose computing data to the GPU 310, and issue one or more general-purpose computing commands to the GPU 310. The general-purpose computing commands may include, e.g., kernel execution commands, memory transfer commands, etc. In some examples, the processor 320 may provide the commands and general-purpose computing data to the GPU 310 by writing the commands and data to the system memory 330, which may be accessed by the GPU 310.

The device 300 may also optionally include a display 340, a user interface 350, and a transceiver module 360. The device 300 may include additional modules or units not shown in FIG. 3 for purposes of clarity. For example, the device 300 may include a speaker and a microphone, neither of which are shown in FIG. 3, to effectuate telephonic communications in examples where the device 300 is a mobile wireless telephone. Furthermore, the various modules and units shown in device 300 may not be necessary in every example of the device 300. For example, the user interface 350 and the display 340 may be external to the device 300 in examples where the device 300 is a desktop computer. As another example, the user interface 350 may be part of the display 340 in examples where the display 340 is a touch-sensitive or presence-sensitive display of a mobile device.

Examples of the user interface 350 include, but are not limited to, a trackball, a mouse, a keyboard, and other types of input devices. The user interface 350 may also be a touch screen and may be incorporated as a part of the display 340. The transceiver module 360 may include circuitry to allow wireless or wired communication between the device 300 and another device or a network. The transceiver module 360 may include modulators, demodulators, amplifiers and other such circuitry for wired or wireless communication. The display 340 may comprise a liquid crystal display (LCD), a cathode ray tube (CRT) display, a plasma display, a touch-sensitive display, a presence-sensitive display, or another type of display device.

As will be explained in more detail below, in accordance with the techniques of the disclosure, the GPU 310 may render frames according to rendering commands generated by the processor 320 and stores the rendered frames in the frame buffer (not shown in FIG. 3). In one embodiment, the frame buffer may be part of a system memory 330. In other embodiments, the frame buffer may be part of separate memory devices.

Figure 4:
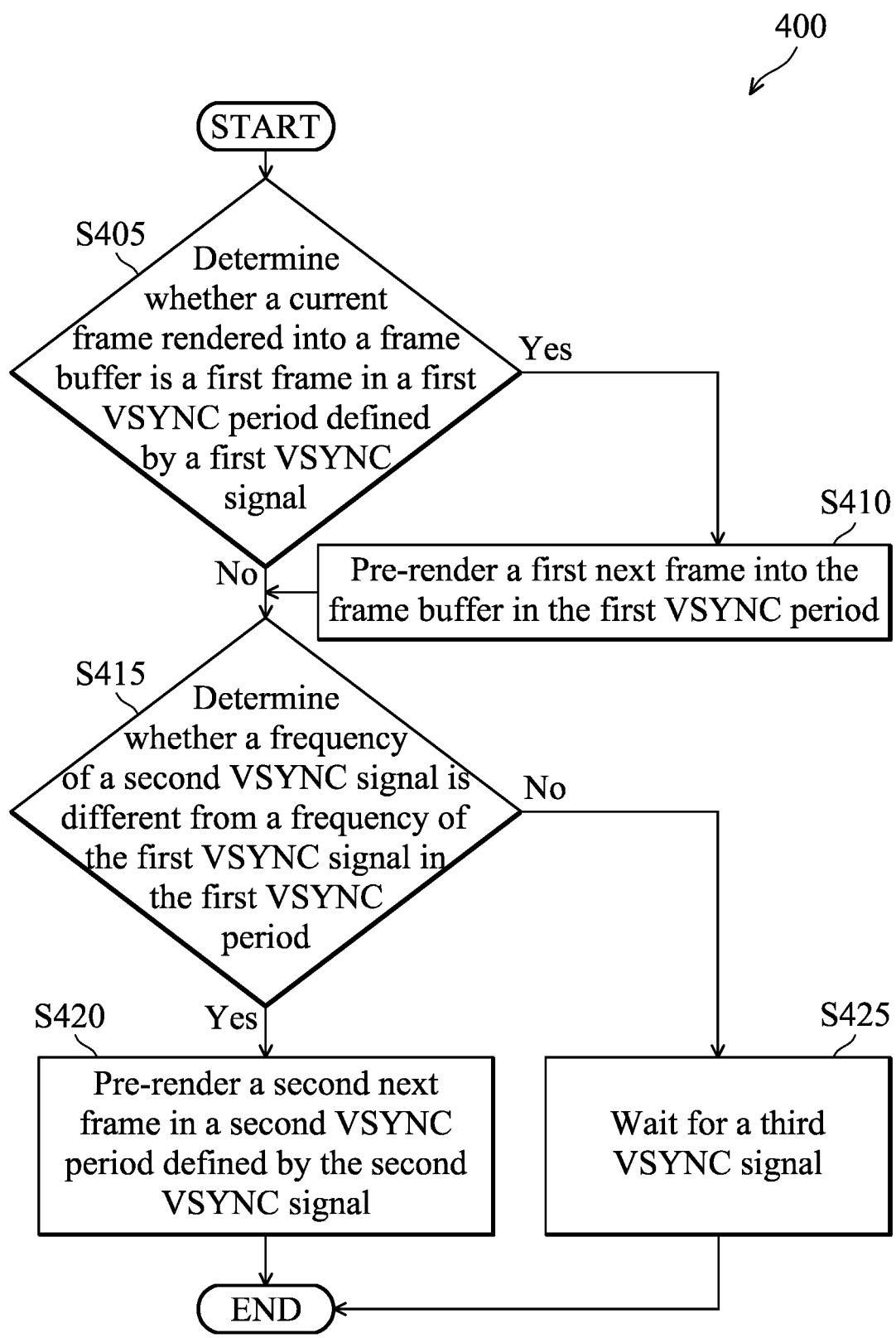
FIG. 4 is a flowchart illustrating the method for improving graphics performance according to an embodiment of the disclosure.

FIG. 4 is a flowchart 400 illustrating the method for improving graphics performance according to an embodiment of the disclosure, wherein the method is applied to and executed by the processor in the device 300 of FIG. 3.

In step S405, the processor determines whether a current frame rendered into a frame buffer is a first frame in a first vertical synchronization (VSYNC) period defined by a first VSYNC signal. It should be noted that one cycle of the VSYNC signal is set to one VSYNC period and the VSYNC period is 1/f (where f is the frames per second (FPS) or the display refresh rate of the display). The value 1/f is often measured in units of milliseconds, although this is not required. In one embodiment, the time when the first VSYNC signal arrives is the time when an animation is generated (e.g., the time that the finger leaves the display after scrolling the display).

When the current frame is the first frame, ("Yes" in step S405), in step S410, the processor pre-renders a first next frame into the frame buffer in the first VSYNC period, wherein the first next frame is a frame that is next to the first frame, and then step S415 is performed.

In step S415, the processor determines whether a frequency of a second VSYNC signal is different from a frequency of the first VSYNC signal in the first VSYNC period, wherein the second VSYNC signal is a VSYNC signal that is next to the first VSYNC signal.

When the frequency of the second VSYNC signal is different from the frequency of the first VSYNC signal, ("Yes" in step S415), in step S420, the processor pre-renders a second next frame in a second VSYNC period defined by the second VSYNC signal, wherein the second next frame is a frame that is next to a frame scheduled to be rendered in the second VSYNC period. In one embodiment, the processor further reverts to an original state of the second next frame before pre-rendering the second next frame. Reverting to the original state of the frame means that after the frame is dropped every time, it needs to be recalculated based on the time of next normal frame.

When the frequency of the second VSYNC signal is not different from the frequency of the first VSYNC signal, ("No" in step S415), in step S425, the processor waits for a third VSYNC signal, wherein the third VSYNC signal is a VSYNC signal that is next to the second VSYNC signal.

Figure 5:
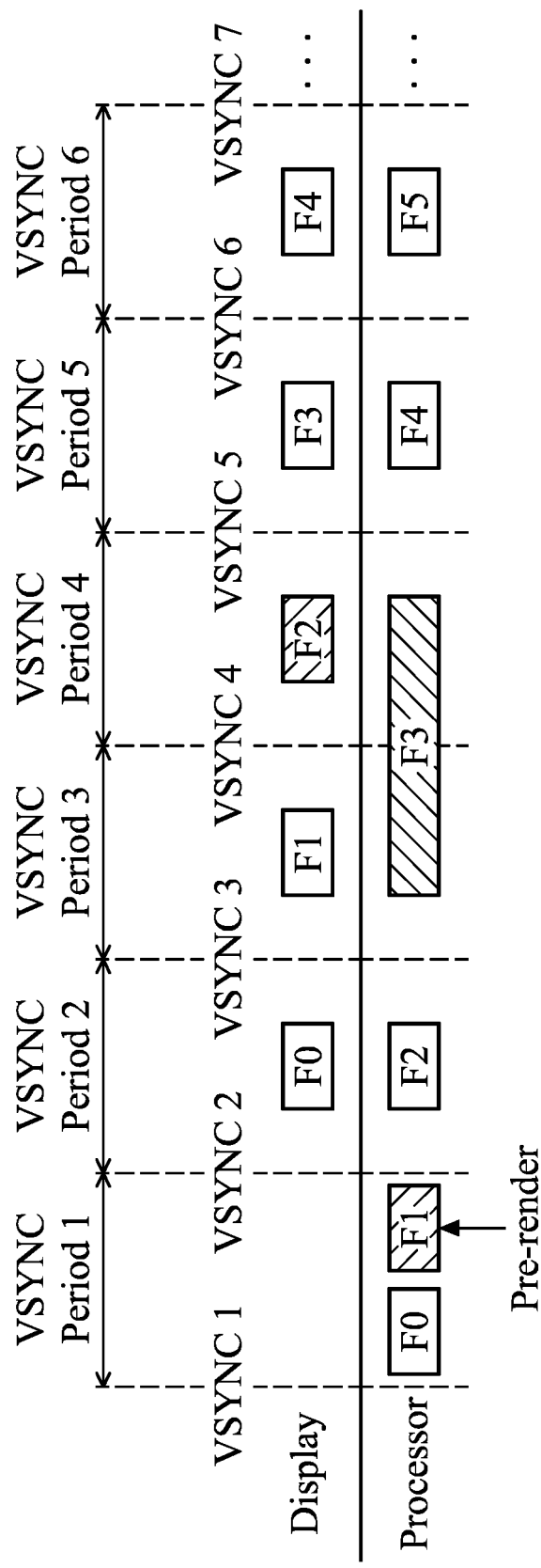
FIG. 5 is a schematic diagram further illustrating the step S410 in the flowchart of FIG. 4 according to an embodiment of the disclosure.

FIG. 5 is a schematic diagram further illustrating the step S410 in the flowchart 400 of FIG. 4 according to an embodiment of the disclosure.

As shown in FIG. 5, when the processor determines that the current frame F0 rendered into the frame buffer is the first frame in a first VSYNC period defined by the first VSYNC signal, the processor pre-renders the second frame F1 into the frame buffer in the first VSYNC period. When a dropped frame F3 occurs in the fourth VSYNC period, the display may display the frame F2 in time since the frame F1 is pre-rendered in the first VSYNC period.

Figure 6:
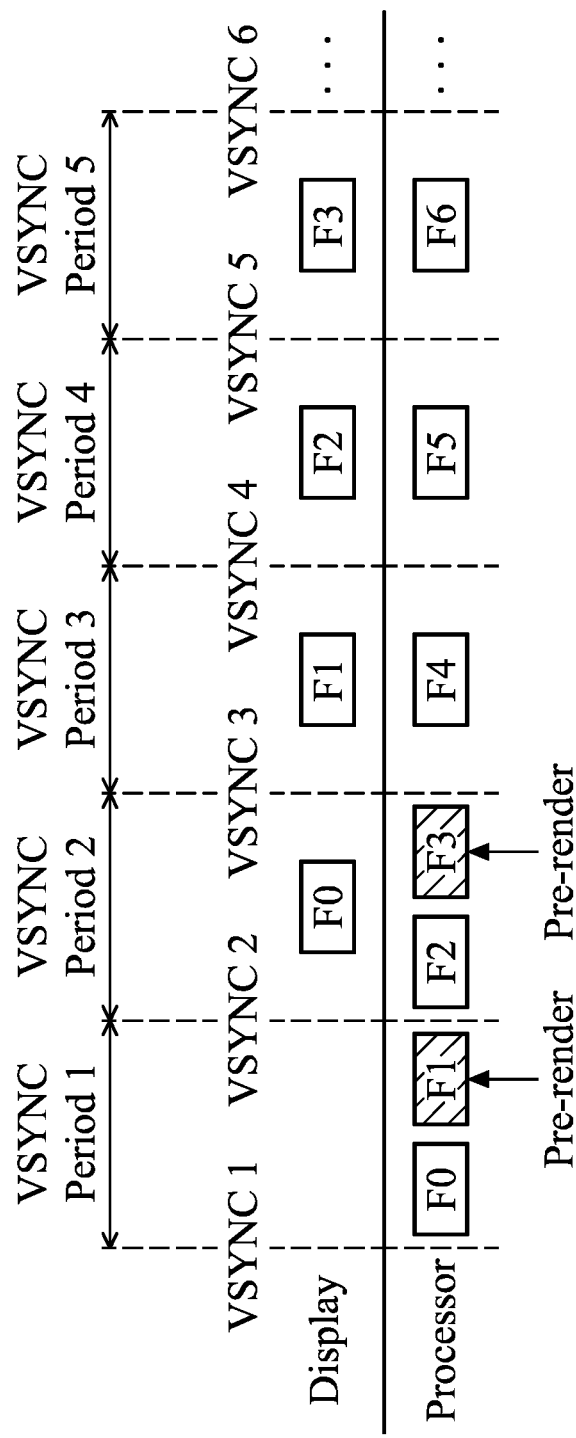
FIG. 6 is a schematic diagram further illustrating the step S420 in the flowchart of FIG. 4 according to an embodiment of the disclosure.

FIG. 6 is a schematic diagram further illustrating the step S420 in the flowchart 400 of FIG. 4 according to an embodiment of the disclosure.

As shown in FIG. 6, when the processor determines that the current frame F0 rendered into the frame buffer is the first frame in a first VSYNC period defined by the first VSYNC signal, the processor pre-renders the second frame F1 into the frame buffer in the first VSYNC period. In the first VSYNC period, the processor determines whether the frequency of a second VSYNC signal is different from the frequency of the first VSYNC signal. When the frequency of the second VSYNC signal is different from the frequency of the first VSYNC signal, the processor pre-renders the frame F3 after the frame F2 scheduled to be rendered in the second VSYNC period. In some embodiments, the processor further reverts to an original state of the frame F3 before pre-rendering the frame F3.

Figure 7:
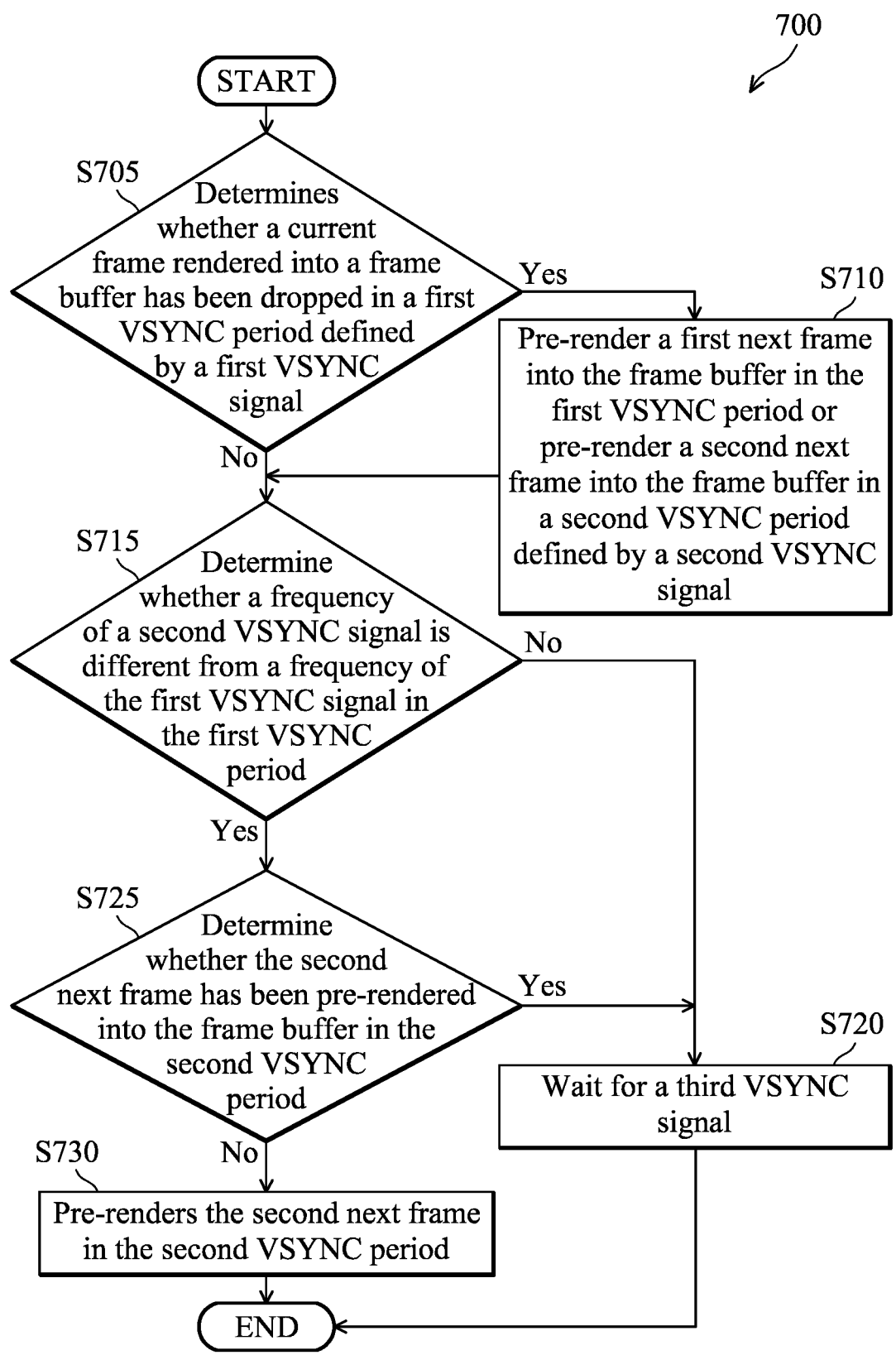
FIG. 7 is a flowchart illustrating the method for improving graphics performance according to an embodiment of the disclosure.

FIG. 7 is a flowchart 700 illustrating the method for improving graphics performance according to an embodiment of the disclosure, wherein the method is applied to and executed by the processor in the device 300 of FIG. 3.

In step S705, the processor determines whether a current frame rendered into a frame buffer has been dropped in a first VSYNC period defined by a first VSYNC signal. It should be noted that one cycle of the VSYNC signal is set to one VSYNC period and the VSYNC period is 1/f (where f is the frames per second or a display refresh rate of the display). The value 1/f can often be measured in units of milliseconds, although this is not required.

When the current frame has been dropped, ("Yes" in step S705), in step S710, the processor pre-renders a first next frame into the frame buffer in the first VSYNC period or pre-renders a second next frame into the frame buffer in a second VSYNC period defined by a second VSYNC signal, wherein the second VSYNC signal is a VSYNC signal that is next to the first VSYNC signal, the first next frame is a frame that is next to the current frame, and the second next frame is a frame that is next to a frame scheduled to be rendered in the second VSYNC period, and then step S715 is performed.

In step S715, the processor determines whether a frequency of a second VSYNC signal is different from a frequency of the first VSYNC signal in the first VSYNC period.

When the frequency of the second VSYNC signal is different from the frequency of the first VSYNC signal, ("Yes" in step S715), in step S725, the processor determines whether the second next frame has been pre-rendered into the frame buffer in the second VSYNC period.

When the frequency of the second VSYNC signal is not different from the frequency of the first VSYNC signal, ("No" in step S715), in step S720, the processor waits for a third VSYNC signal, wherein the third VSYNC signal is a VSYNC signal that is next to the second VSYNC signal.

Back to step S725, when the second next frame has not been pre-rendered into the frame buffer in the second VSYNC period ("No" in step S725), in step S730, the processor pre-renders the second next frame in the second VSYNC period. In one embodiment, the processor further reverts to an original state of the second next frame before pre-rendering the second next frame.

When the second next frame has been pre-rendered into the frame buffer in the second VSYNC period ("Yes" in step S725), in step S720, the processor waits for the third VSYNC signal.

Figure 8A:
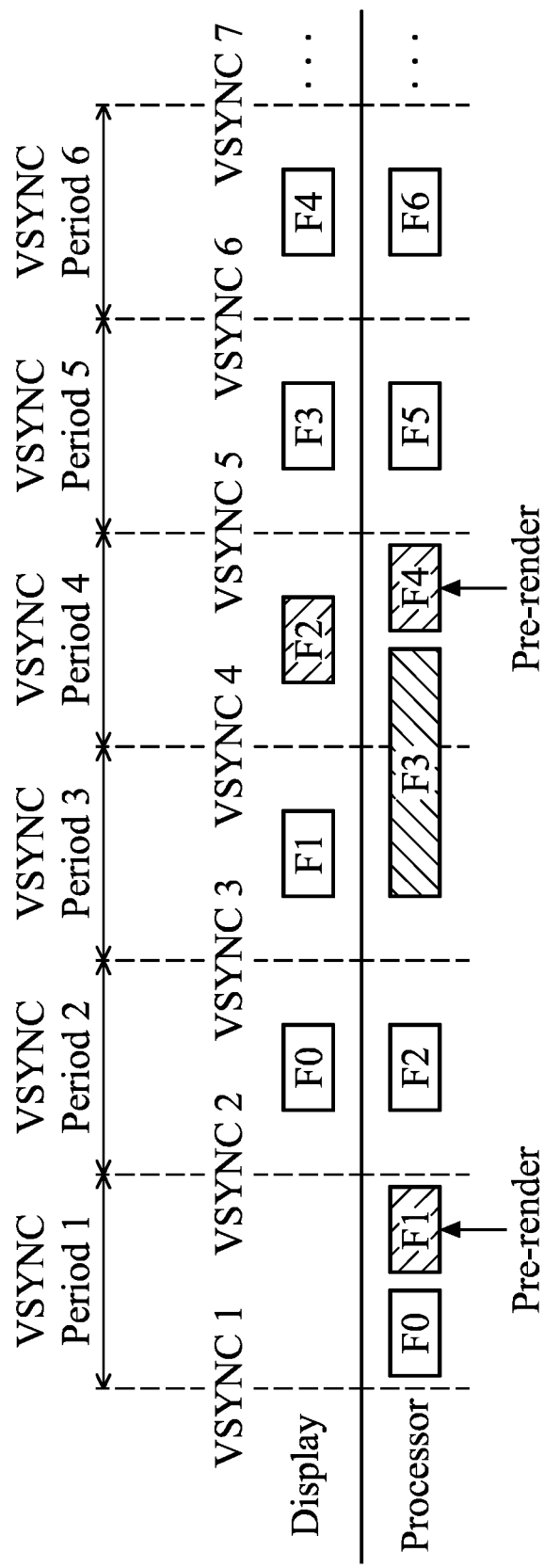
FIGS. 8A and 8B are schematic diagrams further illustrating the step S720 in the flowchart of FIG. 7 according to an embodiment of the disclosure.
Figure 8B:
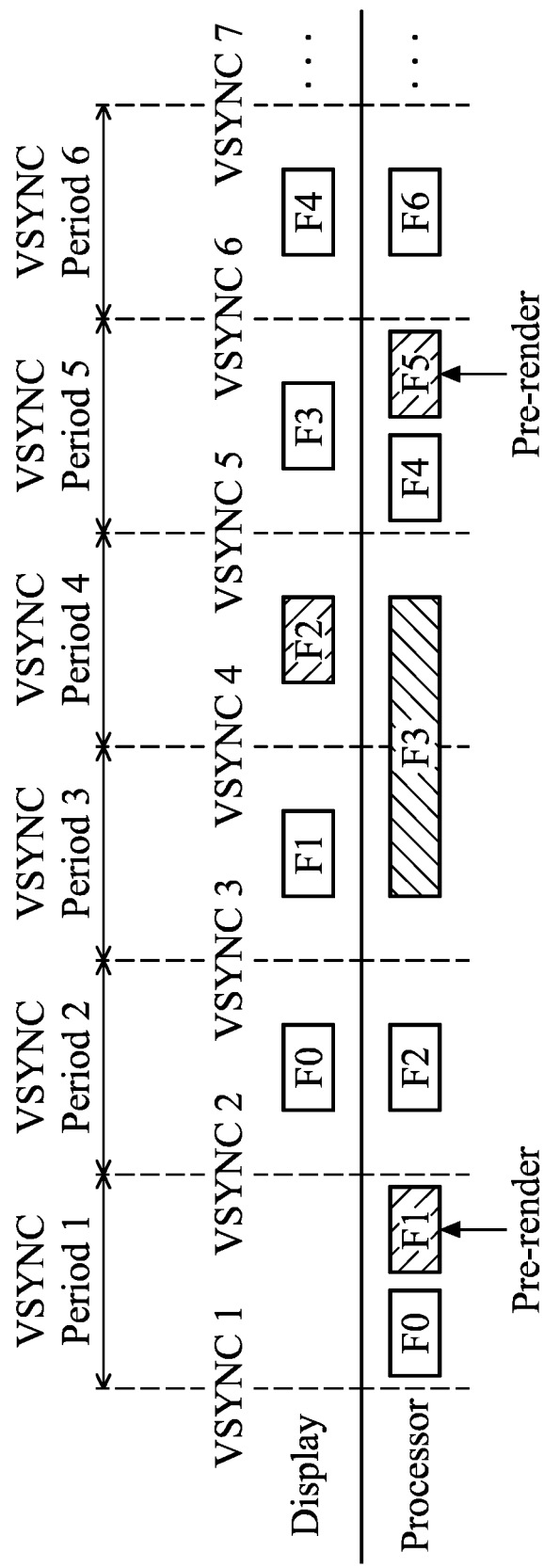

FIGS. 8A and 8B are schematic diagrams further illustrating the step S710 in the flowchart 700 of FIG. 7 according to an embodiment of the disclosure.

When the processor determines that the current frame F3 rendered has been dropped in the fourth VSYNC period defined by the fourth VSYNC signal, the processor may pre-render the first next frame F4 into the frame buffer in the fourth VSYNC period (as shown in FIG. 8A), or the processor may pre-render the second next frame F5 after the frame F4 scheduled to be rendered in the fifth VSYNC period (as shown in FIG. 8B). In addition, when the frame has been dropped in the Nth VSYNC period next time, the processor may pre-render the next frame into the frame buffer in the Nth VSYNC period, or the processor may pre-render the frame next to the next frame into the frame buffer after the next frame scheduled to be rendered in the (N−1)th period.

Figure 9:
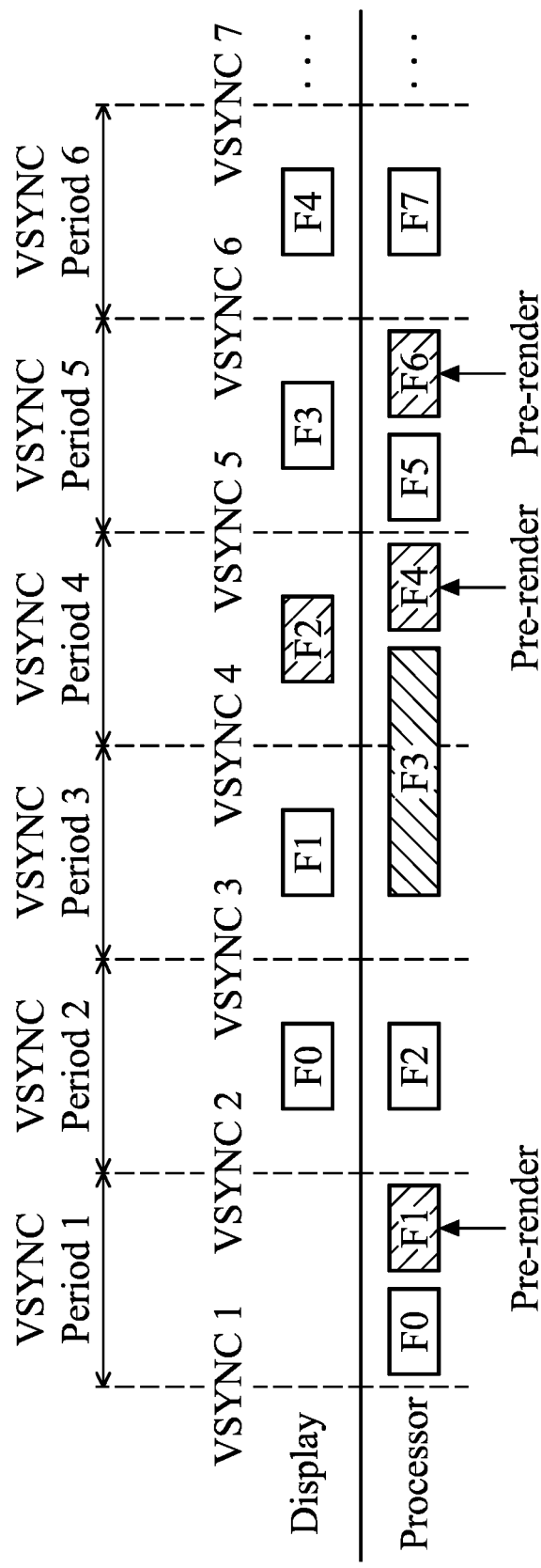
FIG. 9 is a schematic diagram further illustrating the step S730 in the flowchart of FIG. 7 according to an embodiment of the disclosure.

FIG. 9 is a schematic diagram further illustrating the step S730 in the flowchart 700 of FIG. 7 according to an embodiment of the disclosure.

As shown in FIG. 9, when the processor determines that the current frame F3 rendered has been dropped in the fourth VSYNC period defined by the fourth VSYNC signal, the processor may pre-render the first next frame F4 into the frame buffer in the fourth VSYNC period. In the fourth VSYNC period, the processor further determines whether the frequency of the fourth VSYNC signal is different from the frequency of the fifth VSYNC signal. When the frequency of the fourth VSYNC signal is different from the frequency of the fifth VSYNC signal, the processor pre-renders the frame F6 after the frame F5 scheduled to be rendered in the fifth VSYNC period. In some embodiments, the processor further reverts to an original state of the frame F6 before pre-rendering the frame F6.

Therefore, a method and a device for improving graphics performance provided in the disclosed embodiments may pre-render frames to avoid a visual stuttering effect caused by dropped frames, and give the user a better viewing experience.

Furthermore, the processor 320 in the device 300 can execute the program code in the system memory 330 to perform the above-described actions and steps or other descriptions herein.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for improving graphics performance, comprising:
    determining whether a current frame rendered into a frame buffer is a first frame in a first vertical synchronization (VSYNC) period defined by a first VSYNC signal;
    pre-rendering a first next frame into the frame buffer in the first VSYNC period when the current frame is the first frame, wherein the first next frame is a frame that is next to the first frame;
    determining whether a frequency of a second VSYNC signal is different from a frequency of the first VSYNC signal in the first VSYNC period, wherein the second VSYNC signal is a VSYNC signal that is next to the first VSYNC signal; and
    pre-rendering a second next frame in a second VSYNC period defined by the second VSYNC signal when the frequency of the second VSYNC signal is different from the frequency of the first VSYNC signal, wherein the second next frame is a frame that is next to a frame scheduled to be rendered in the second VSYNC period.

2. The method as claimed in claim 1, further comprising:
    waiting for a third VSYNC signal when the frequency of the second VSYNC signal is not different from the frequency of the first VSYNC signal, wherein the third VSYNC signal is a VSYNC signal that is next to the second VSYNC signal.

3. A method for improving graphics performance, comprising:
    determining whether a current frame rendered into a frame buffer has been dropped in a first vertical synchronization (VSYNC) period defined by a first VSYNC signal;
    pre-rendering a first next frame into the frame buffer in the first VSYNC period or pre-rendering a second next frame into the frame buffer in a second VSYNC period defined by a second VSYNC signal when determining that the current frame has been dropped, wherein the second VSYNC signal is a VSYNC signal that is next to the first VSYNC signal, the first next frame is a frame that is next to the current frame and the second next frame is a frame that is next to a frame scheduled to be rendered in the second VSYNC period;

determining whether a frequency of the second VSYNC signal is different from a frequency of the first VSYNC signal in the first VSYNC period;

determining whether the second next frame has been pre-rendered into the frame buffer in the second VSYNC period when the frequency of the second VSYNC signal is different from the frequency of the first VSYNC signal; and pre-rendering the second next frame in the second VSYNC period when the second next frame has not been pre-rendered into the frame buffer in the second VSYNC period.

4. The method as claimed in claim 3, further comprising:
waiting for a third VSYNC signal when the second next frame has been pre-rendered into the frame buffer in the second VSYNC period, wherein the third VSYNC signal is a VSYNC signal that is next to the second VSYNC signal.

5. The method as claimed in claim 3, further comprising:
waiting for a third VSYNC signal when the frequency of the second VSYNC signal is not different from the frequency of the first VSYNC signal, wherein the third VSYNC signal is a VSYNC signal that is next to the second VSYNC signal.

6. A device for improving graphics performance, comprising:
at least one processor; and
a computer-readable storage medium, configured to store instructions, that when executed by the processor, cause the device to perform functions comprising:
determining whether a current frame rendered into a frame buffer is a first frame in a first vertical synchronization (VSYNC) period defined by a first VSYNC signal;
pre-rendering a first next frame into the frame buffer in the first VSYNC period when the current frame is the first frame, wherein the first next frame is a frame that is next to the first frame; and
determining whether a frequency of a second VSYNC signal is different from a frequency of the first VSYNC signal in the first VSYNC period, wherein the second VSYNC signal is a VSYNC signal that is next to the first VSYNC signal; and
pre-rendering a second next frame in a second VSYNC period defined by the second VSYNC signal when the frequency of the second VSYNC signal is different from the frequency of the first VSYNC signal, wherein the second next frame is a frame that is next to a frame scheduled to be rendered in the second VSYNC period.

7. The device as claimed in claim 6, wherein the functions performed by the device further comprise:
waiting for a third VSYNC signal when the frequency of the second VSYNC signal is not different from the frequency of the first VSYNC signal, wherein the third VSYNC signal is a VSYNC signal that is next to the second VSYNC signal.

8. A device for improving graphics performance, comprising:
at least one processor;
a computer-readable storage medium, configured to store instructions, that when executed by the processor, cause the device to perform functions comprising:
determining whether a current frame rendered into a frame buffer has been dropped in a first vertical synchronization (VSYNC) period defined by a first VSYNC signal;
pre-rendering a first next frame into the frame buffer in the first VSYNC period or pre-rendering a second next frame into the frame buffer in a second VSYNC period defined by a second VSYNC signal when determining that the current frame has been dropped, wherein the second VSYNC signal is a VSYNC signal that is next to the first VSYNC signal, the first next frame is a frame that is next to the current frame and the second next frame is a frame that is next to a frame scheduled to be rendered in the second VSYNC period;
determining whether a frequency of the second VSYNC signal is different from a frequency of the first VSYNC signal in the first VSYNC period;
determining whether the second next frame has been pre-rendered into the frame buffer in the second VSYNC period when the frequency of the second VSYNC signal is different from the frequency of the first VSYNC signal; and
pre-rendering the second next frame in the second VSYNC period when the second next frame has not been pre-rendered into the frame buffer in the second VSYNC period.

9. The device as claimed in claim 8, wherein the functions performed by the device further comprise:
waiting for a third VSYNC signal when the second next frame has been pre-rendered into the frame buffer in the second VSYNC period, wherein the third VSYNC signal is a VSYNC signal that is next to the second VSYNC signal.

10. The device as claimed in claim 8, wherein the functions performed by the device further comprise:
waiting for a third VSYNC signal when the frequency of the second VSYNC signal is not different from the frequency of the first VSYNC signal, wherein the third VSYNC signal is a VSYNC signal that is next to the second VSYNC signal.

* * * * *